(12) United States Patent
Wust

(10) Patent No.: US 8,651,999 B2
(45) Date of Patent: Feb. 18, 2014

(54) DRIVING DEVICE

(75) Inventor: Bernhard Wust, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 306 days.

(21) Appl. No.: 12/932,467

(22) Filed: Feb. 25, 2011

(65) Prior Publication Data

US 2011/0232287 A1    Sep. 29, 2011

(30) Foreign Application Priority Data

Mar. 24, 2010   (DE) .......................... 10 2010 012 667

(51) Int. Cl.
*B60W 10/02* (2006.01)

(52) U.S. Cl.
USPC .................................. 477/5; 475/5

(58) Field of Classification Search
USPC .................. 180/65.21, 65.22, 65.235, 65.25; 310/112–114, 83; 318/139; 475/5; 477/3, 5; 903/906, 951
See application file for complete search history.

(56) References Cited

U.S. PATENT DOCUMENTS

| | | | |
|---|---|---|---|
| 5,823,280 A * | 10/1998 | Lateur et al. ............. | 180/65.235 |
| 7,594,869 B2 * | 9/2009 | Holmes .............................. | 475/5 |
| 7,699,737 B2 | 4/2010 | Berhan | |
| 2003/0153429 A1 * | 8/2003 | Boll .................................. | 477/6 |
| 2005/0175479 A1 * | 8/2005 | Gandrud et al. ........... | 417/410.1 |
| 2007/0007059 A1 * | 1/2007 | Nomura et al. .............. | 180/65.2 |
| 2008/0000701 A1 * | 1/2008 | Ebner et al. .................. | 180/65.2 |
| 2008/0173487 A1 * | 7/2008 | Kamada et al. .............. | 180/65.4 |
| 2009/0250278 A1 * | 10/2009 | Kawasaki et al. ........ | 180/65.275 |
| 2010/0029436 A1 * | 2/2010 | Katsuta et al. .................... | 477/5 |
| 2010/0041503 A1 * | 2/2010 | Borntraeger ...................... | 475/5 |

FOREIGN PATENT DOCUMENTS

| | | |
|---|---|---|
| DE | 197 29 550 | 1/1999 |
| DE | 10 2004 053 948 | 6/2006 |
| DE | 10 2006 013 296 | 9/2007 |
| DE | 11 2005 003 440 | 3/2009 |

* cited by examiner

*Primary Examiner* — Justin Holmes
*Assistant Examiner* — Huan Le
(74) *Attorney, Agent, or Firm* — Farjami & Farjami LLP

(57) ABSTRACT

A drive device has an internal combustion engine, a first electrical machine, and a second electrical machine. The first electrical machine is at least indirectly connectable to the internal combustion engine. In addition, the drive device has an output which is at least indirectly connected to an output shaft. According to the invention, a switching device is provided, using which, in a first state, the internal combustion or the first electrical machine is connectable to the output shaft or, in a second state, the second electrical machine is connectable to the output shaft.

20 Claims, 3 Drawing Sheets

|     | Description | Type | 3 | 4 | 2 | 26 | 27 | 31 | 32 |
|-----|-------------|------|---|---|---|----|----|----|----|
| I   | Gear stage 1 | DE | G | M | M | - | + | - | + |
| II  | Gear stage 1 | E | - | M | - | - | + | - | + |
| III | Gear stage 1 | D | O/(M) | - | M | + | - | - | + |
| IV  | Gear stage 2 | DE | G | M | M | - | + | + | - |
| V   | Gear stage 2 | E | - | M | - | - | - | + | - |
| VI  | Gear stage 2 | D | O/(M) | - | M | + | - | + | - |
| VII | Stationary | - | 0- | - | M/- | - | + | +/- | -/+ |
| VIII| Starting | - | M | - | M | - | + | -/+ | -/+ |
| IX  | Reverse gear | DE | G | M | M | - | + | - | + |
| X   | Reverse gear | E | - | M | - | - | + | - | + |
| XI  | Braking (I, II, IV, V) | DE | (M) | G | (MB) | - | + | +/- | -/+ |
| XII | Braking (III, VI) | D | G | - | (MB) | + | - | +/- | -/+ |

5
+    closed
-    open/not in operation
0    unpowered
G    generator operation
M    motor operation
MB   engine brake
10
( )   optional
/    either/or

FIG. 2

DRIVING DEVICE

This application claim priority under 35 USC§119 from German Patent Application Serial No. 102010012667.5, filed on Mar. 24, 2010.

The invention relates to a drive device according to the type defined in the preamble of claim 1. In addition, the invention relates to the use of such a drive device.

Drive devices having an internal combustion engine and electrical machines in combination with one another, for example, for the drive in vehicles, are known from the general prior art. Such drive devices are also referred to as hybrid drives. In the hybrid drives, one differentiates between two fundamental technical concepts.

The first technical concept is the so-called serial hybrid drive, which is constructed in such a way that the internal combustion engine drives a first electrical machine as a generator and thus generates current. The current thus generated is supplied via power electronics and optionally a buffer to a second electrical machine. A construction thus results in which no mechanical coupling is provided between the internal combustion engine and the output. The construction allows the provision of a continuously variable electrical transmission via the power electronics. Its advantages are particularly in non-stationary operation, for example, in a vehicle during starting and acceleration, since the internal combustion engine can be operated in the respective best efficiency range independently of the speeds of the drive axle. A decisive disadvantage of this serial hybrid drive results at constant loads, in particular in the range of greater powers. In a vehicle, this would be rapid constant travel having correspondingly high driving resistances, for example. In this operating state, the transmission losses of the power generated by the internal combustion engine via the purely electrical pathway have a negative effect as a function of the losses of the individual participating electrical components, i.e., the generator, the electric motor, and at least the power electronics.

The second known and typical hybrid concept is the so-called parallel hybrid or parallel hybrid drive. A parallel hybrid drive is to be understood as the combination of a mechanical transmission with at least one electrical machine. Depending on the implementation and design, there is always a greater or lesser proportion of mechanical power transmission from the internal combustion engine to the output. Therefore, the total installed electrical power can be smaller. Depending on the concept and operating state, this allows better transmission efficiency than in the case of the above-described serial hybrid drive. The disadvantage of the parallel hybrid is that the mechanical outlay is very high and the possibility of operating the internal combustion engine in the ideal efficiency range is very restricted, since it is always or almost always also used for providing the typically highly-dynamic required power, for example, in a vehicle. This is true in particular if additional electrical power is supplied from an electrical power storage unit, for example, a battery, capacitor, or combinations thereof, or must be conducted away to charge the electrical power storage unit.

The object of the present invention comprises providing a drive device which combines the above-mentioned advantages of both systems, without having to accept their disadvantages, and without causing a large mechanical outlay.

This object is achieved according to the invention by the features mentioned in the characterizing part of claim 1. Further advantageous embodiments of the invention result from the dependent subclaims. A preferred use of the drive device according to the invention is specified in claim 14.

The drive device according to the invention essentially comprises a serial hybrid drive, in which a direct mechanical connection can be provided via an additional switching device between the internal combustion engine or the first electrical machine connectable thereto and the output. Depending on the state of the switching device, a solely serial hybrid drive can thus be implemented, in which the power transmission between the first electrical machine and the second electrical machine occurs solely electrically, and there is no mechanical connection between the output and the internal combustion engine. In the other state, a mechanical connection can be implemented via the switching device between the internal combustion engine or the first electrical machine connected or connectable thereto and the output. The second electrical machine is then decoupled accordingly. A construction thus results which essentially corresponds to the construction of a simplified parallel hybrid. The drive device according to the invention thus provides a corresponding expansion of a serial hybrid drive with minimal mechanical outlay and therefore also minimal installation space requirement in such a way that in specific states, a mechanical connection can be provided between the internal combustion engine and the output, in order to be able to drive the output via this purely mechanical connection at high powers, or in the case of a vehicle in constant travel having high driving resistances, for example. The first electrical machine, which is still connectable to the internal combustion engine and therefore also to the output, can either be used for recuperation of electrical power during deceleration or also for supplying electrical power from energy stored in an electrical power storage unit during acceleration, for example.

In the switching state in which the mechanical connection is interrupted, all advantages of a serial hybrid may be implemented, for example, the solely electrical travel drive having corresponding decoupling of the internal combustion engine during travel, if the electrical power comes from the power storage unit. Solely electrical braking and recuperation of braking energy via the second electrical machine is also possible. The construction analogous to the serial hybrid with mechanically separated connection between the output and the internal combustion engine additionally allows the startup of the internal combustion engine via the construction, so that an additional electric motor is not required for a starter motor. In suitable driving situations, the advantage of the serial hybrid as a continuously variable electrical transmission having arbitrary rotational direction and a large possible bandwidth of torques can additionally be used.

The drive device according to the invention therefore allows the advantages of both hybrid concepts to be unified, depending on the operating state, with minimal additional installation space and a minimal number of additional required components to be activated.

In a particularly favorable embodiment of the drive device, the shafts of the internal combustion engine and the two electrical machines are situated aligned with one another. This construction having shafts situated aligned with one another allows a very compact construction of the drive device, so that it can be integrated easily and simply in a vehicle, in particular in a utility vehicle, for example.

In a particularly favorable and advantageous refinement thereof, it is additionally provided that the second electrical machine is implemented having a hollow shaft, through which the output shaft is guided. The output shaft can be guided through the hollow shaft in the rotor of the second electrical machine in this construction. This is because the switching device can be implemented as a single switching device, which alternately connects the hollow shaft to the output shaft guided therethrough or the output shaft to the shaft, which is situated in the extension of the hollow shaft, of the first electrical machine or the internal combustion engine. Overall, a very compact construction thus results.

In a very advantageous refinement thereof, the switching device is situated between the two electrical machines. An installation space which is available in the area of the rotors of the two electrical machines, for example, can thus be used to make the construction still more compact.

Fundamentally, it is possible to implement the internal combustion engine and the first electrical machine as connectable via further clutch elements. According to a particularly favorable and advantageous refinement of the drive device according to the invention, however, the first electrical machine is connected directly or via a torsional vibration damper to the internal combustion engine. This connection of the first electrical machine, directly or indirectly via a torsional vibration damper, to the internal combustion engine, without a clutch element or the like being necessary here, allows the above-mentioned compact construction to be made still more space-saving.

In a further very favorable embodiment of the idea according to the invention, it is further provided that the output shaft is connected to the output via a transmission having at least two gear stages, which are switchable via a switching module. This construction having a transmission having at least two gear stages, for example, in the form of a planetary set, allows a corresponding speed spread between the output shaft and the actual output of the drive device. The variability is thus increased using simple means and in particular the internal combustion engine are switchable in via the switching device in suitable transmission ratios.

In a further advantageous embodiment of the construction according to the invention, it is provided that the switching device and/or the switching module are implemented as dog clutches. This construction of the switching device for the mechanical connection or decoupling of the internal combustion engine to or from the output shaft and optionally of the switching module for switching the gear stages in the optional transmission in the form of dog clutches is particularly cost-effective and very small with respect to the required installation space. The dog clutches can very safely and reliably produce or disengage a connection at identical or analogous provided speeds. To achieve such a synchronization of the speeds, for example, the electronic controller of the two electrical machines can be implemented in such a way that it ensures a synchronization for switching of the dog clutches in the case of a switch. In an alternative embodiment, which requires more components and more installation space, however, it would also be conceivable to implement the dog clutches using synchronizing elements or instead to use friction clutches, for example, lamellar clutches.

According to a particularly favorable refinement of the drive device according to the invention, it is additionally provided that at least one of the electrical machines is implemented as a transversal flux machine. The known constructive advantage of the decoupling of the magnetic and electrical circuit results from the construction of a transversal flux machine T, which is known per se, so that a much finer pole pitch is possible through the design construction. At low speeds, very high torques may thus already be implemented, which is of decisive significance in particular for the use of the drive device in a vehicle, e.g., during electrical or electrically-supported starting on hills.

In a corresponding favorable refinement of the drive device according to the invention, the two electrical machines are implemented as transversal flux machines, the first electrical machine being designed as a generator and the second electrical machine being designed as a drive motor having field attenuation. Using this design, a corresponding controllability of the second electrical machine can be ensured for the switching state as a serial hybrid and the design simultaneously guarantees the best possible efficiency of the first electrical machine as a generator and the second electrical machine as a drive motor.

In a further advantageous embodiment of the drive device according to the invention, it is also provided that the two electrical machines are implemented as transversal flux machines, the first electrical machine being implemented as a monophasic electrical machine, which is implemented having the same construction as half of the second electrical machine, which is implemented as a biphasic electrical machine. In this variant of the drive device according to the invention, it is thus provided that a total of three halves of the second electrical machine having identical constructions are used. Two of the halves are assembled to form the biphasic second electrical machine, while the remaining third half is used as the first electrical machine. Costs during the production of the electrical machines can thus be saved through the overall higher number of halves having identical constructions.

In a favorable embodiment of the drive device according to the invention, it is additionally provided that the two electrical machines and the switching device, and optionally the transmission and the switching module, are situated in a common housing. This construction in a common housing is used in particular for the very compact construction, which has already been mentioned multiple times, so that, for example, the installation space for a previous mechanical or also mechanical/hydrodynamic transmission can now be used for the drive device according to the invention in a housing having comparable dimensions, connection elements, and the like.

In an advantageous refinement thereof, it is further provided that structure-borne noise insulation and/or electrical insulation is situated between the housing and at least some of the components situated therein. In particular the actuation of the switching device and the switching module as well as vibrations of the two electrical machines can be insulated via structure-borne noise insulation, so that the drive device according to the invention causes very low emissions of noises and vibrations in the embodiment described here. In addition, if needed the components, in particular the components of the electrical machines, can also be electrically insulated in relation to the housing or also drives and outputs leading out of the housing, so that there is no danger of electrical voltages in the external area of the housing or in the area of components protruding out of the housing.

As already described, the drive device according to the invention is to be operated very dynamically and over various operating states with the best possible efficiency and can additionally be constructed very compactly. The preferred use, but not the only possible use of the drive device according to the invention is therefore in the drive of a road or railway vehicle, in particular a utility vehicle or bus. In particular in the case of use in vehicles, various operating states occur, in which the drive device according to the invention can display the special advantages with respect to the efficiency and the functionality either using the mechanical coupling between the internal combustion engine and the output shaft or in its switching state analogous to a serial hybrid. Therefore, the preferred use is in the field of vehicles, since a dynamic change between individual operating states occurs very frequently here, which is to be expected more rarely or not at all in the case of stationary facilities.

Further advantageous embodiments of the invention result from the exemplary embodiment, which is explained in greater detail hereafter with reference to the figures.

In the figures:

FIG. 2 shows a switching matrix to illustrate various driving states and the associated switching states of the drive device according to FIG. 1.

Figure 1:
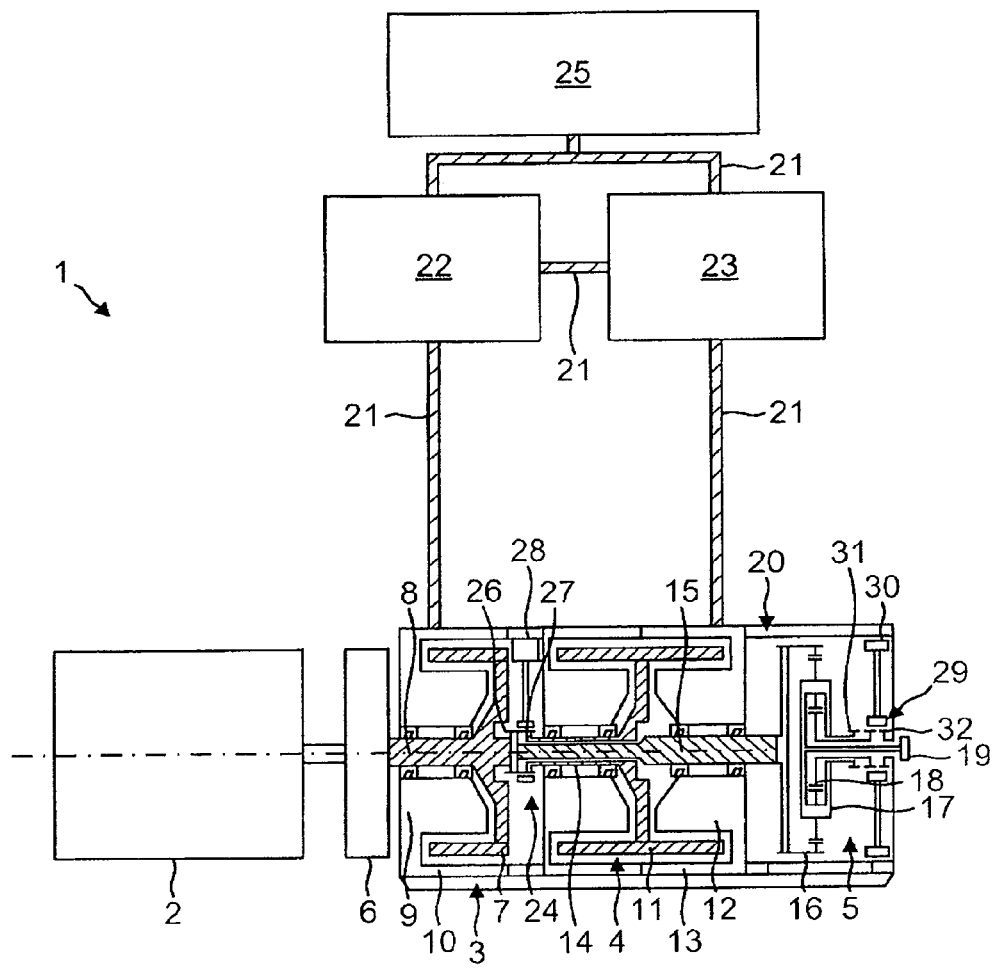
FIG. 1 shows an exemplary construction of the drive device according to the invention.

An exemplary construction of a drive device 1 according to the invention is shown in the illustration of FIG. 1. The drive device 1 can be used for manifold drive purposes. For example, it can be used to drive a vehicle (not shown in greater detail), in particular a utility vehicle or a bus. The drive device 1 comprises an internal combustion engine 2, which will typically be implemented as a diesel engine in the above-mentioned example of a utility vehicle, as well as a first electrical machine 3 and a second electrical machine 4. In the exemplary embodiment shown here, the drive device 1 additionally has a transmission 5. The internal combustion engine 2 is connected via a typical torsional vibration damper 6 (known per se), which can be implemented as a vibration damper and/or mass damper, to a rotor 7 of the first electrical machine 3. The first electrical machine 3 is implemented as a transversal flux machine, so that the rotor 7, which rotates around a shaft 8 implemented integrally therewith, for example, revolves between an inner stator 9 and an outer stator 10.

The second electrical machine 4 is also implemented as a transversal flux machine, in contrast to the monophasic first electrical machine 3, it being implemented as a biphasic electrical machine. The second electrical machine 4, which is also implemented in transversal flux construction, can be constructed from two identical parts, so that each of the parts is constructed having an identical or very similar construction as the rotor 7 and the shaft 8 of the first electrical machine. This allows the use of identical parts, whose piece count is then accordingly higher, so that costs can be saved in this way. Because the second electrical machine 4 is also implemented as a transversal flux machine, a rotor 11 also rotates between an inner stator 12 and an outer stator 13 therein. A shaft 14 of the second electrical machine 4, which is situated aligned with the shaft 8, is implemented as a hollow shaft. An output shaft 15, which is connected to the transmission 5, runs through the hollow shaft 14. The transmission 5 is implemented as a planetary transmission, in which in the exemplary embodiment shown here a direct connection is implemented between the output shaft 15 and an outer ring 16 or a hollow wheel 16. In a known way, the outer ring 16 acts via planets situated on a web 17 on a sun wheel 18 of the planetary transmission. The web 17 is additionally connected in a rotationally-fixed manner to the output 19 of the drive device 1.

The internal combustion engine 2 and the two electrical machines 3, 4 as well as the transmission 5 are situated having their shafts 8, 14, 15 or their primary rotational axes aligned with one another, whereby a very compact construction results. The two electrical machines 3, 4 and the transmission 5 are situated in a common housing 20 or integrated in a common external housing 20. All components situated therein can be insulated in a way not shown in greater detail via structure-borne noise insulation or electrical insulation in relation to the housing 20 or also components protruding out of the housing 20, in order to prevent or minimize, respectively, the transmission of electrical voltages, on the one hand, and structure-borne noise emissions, on the other hand.

The functional construction of the drive device 1 is now that it can be used like a serial hybrid drive. For this purpose, the internal combustion engine 2 drives the first electrical machine 3 and generates current by generator operation of the first electrical machine, which reaches a first inverter 22 via electrical connection lines 21. The power generated by the first electrical machine 3 can then be conducted, suitably converted via a second inverter 23 via further electrical connection lines 21 to the area of the second electrical machine 4 and drive it as a motor. The second electrical machine 4 is then connected in a way described in greater detail hereafter via a switching device 24 to the output shaft 15 and via the transmission 5 to the output 19. Via further electrical connection lines 21, an electrical power storage unit 25 can be incorporated in a way known per se, in order to store braking power, which arises during braking of the drive device 1 and is converted via one of the electrical machines 3, 4 into electrical power, or also to buffer excess power from the internal combustion engine 2. Since this use of an electrical power storage unit 25 in hybrid drives is known and typical per se, it will not be discussed in greater detail here.

The above-mentioned switching device 24 essentially comprises two dog clutches 26, 27 and a dog clutch module 28. One dog clutch 26 can be opened and the other dog clutch 27 can be closed simultaneously or vice versa via the dog clutch module 28, which can be operated electrically, pneumatically, or also hydraulically. In the exemplary embodiment shown in FIG. 1, the dog clutch module 28 is switched in such a way that the dog clutch 27 is closed and the dog clutch 28 is open. This means that a connection between the output shaft 15 and the hollow shaft 14, through which the output shaft 15 is guided, is achieved. The second electrical machine 4 is thus connected to the output shaft 15 and therefore via the transmission 5 to the output 19. The first electrical machine 3, which is connected to the internal combustion engine 2, is decoupled from the output shaft 15. The construction shown here thus essentially corresponds to that of a serial hybrid drive. It offers the corresponding advantages, so that a continuously variable electrical transmission can be represented via the inverters 22, 23, which can adapt speed, rotational direction, and torque in a nearly arbitrary way. The internal combustion engine 2 can then always be operated in the ideal operating point. In addition, the first electrical machine 3 also permits the starting of the internal combustion engine 2, so that an additional starter motor can be dispensed with here. Two different switching states are possible via the transmission 5, which are described in greater detail hereafter. Instead of the transmission 5 shown in the exemplary embodiment having only two switching states, other constructions would be conceivable, of course, for example, a planetary set having three switching states or a construction made of multiple planetary transmissions and/or spur gears, so that multiple gear stages could be implemented here. However, this is known from general transmission technology, so that it will not be discussed in greater detail here.

As already noted, the transmission 5 shown here can implement two different switching stages. For this purpose, it has a switching module 29, which also has a dog clutch module 33 and two dog clutches 31 and 32. In the exemplary embodiment shown here, the dog clutch 32 is closed and the dog clutch 31 is open. This means that the sun wheel 18 is fixedly connected to the housing 20, i.e., is stationary. The power transmitted from the output shaft 15 is thus conducted via the outer wheel 16 and the web 17 to the output 19 with stationary sun wheel 18. This state is identified as gear stage 1 in the switching matrix shown in FIG. 2. In the other possible switch variant, namely when the dog clutch 31 is closed, the web 17 is connected to the sun wheel 18, so that the power coming from the output shaft 15 via the outer wheel 16 is conducted in a different transmission ratio to the output 19 connected to the web 17. This switching state is referred to hereafter as gear stage 2.

Independently of the switching state of the switching module 29, the construction illustrated and described here can be implemented analogously to a serial hybrid drive via the switching device 24, for example. In the event of a corresponding changeover, so that the dog clutch 27 is opened and the dog clutch 26 is closed, the second electrical machine 4 is decoupled from the output shaft 15 and a direct connection is implemented between the first electrical machine 3 and the output shaft 15. Since the first electrical machine 3 is additionally connected to the internal combustion engine 2, a direct connection can additionally be implemented between the output shaft 15 and the internal combustion engine 2 by closing the dog clutch 26. This is particularly advisable in the case of high drive powers, for example, in particular in the case of rapid travel at constant velocity and correspondingly high driving resistance of a vehicle equipped with the drive device 1, since in these operating states better efficiencies are to be achieved through the mechanical connection of the internal combustion engine 2 to the output shaft 15 and via the transmission to the output 19 than if the connection were performed exclusively electrically via the inverters 22, 23 and the two electrical machines 3, 4. Due to the decoupled electrical machine 2, it does not also have to be moved, so that drag losses can be avoided here. The two electrical machines 3, 4 are situated one behind the other in the housing 20 and the switching device 24 is placed between the two electrical machines 3, 4. This is possible through the implementation of the shaft 14 of the rotor 11 of the second electrical machine 4 as a hollow shaft, so that a large variability of the construction is possible using a single switching device, which alternately connects the output shaft 15 to the hollow shaft 14 or the shaft 8 of the first electrical machine 3. It is mechanically very simple and manages using very few components.

Through the use of dog clutches 26, 27 and 31, 32, a very simple and compact construction is achieved, which may be implemented very cost-effectively. The dog clutches require a relative speed for switching between the components to be switched which is very small or is ideally zero. In order to achieve this, a corresponding torque and speed behavior of the electrical machines 3, 4 can be influenced via the power electronics, which are integrated in the inverters 22, 23 or situated parallel thereto, in such a way that comparatively low relative speeds exist between the dog clutches 26, 27 and 31, 32 to be switched at the switching time. Additionally or alternatively thereto, it would also be conceivable to install synchronizing devices, in order to mechanically adapt the speeds during switching of the dog clutches in such a way that switching is possible. However, this would require an additional outlay for components and therefore for installation space and costs in relation to the above-described construction. Furthermore, of course, it would also be conceivable to replace the dog clutches with friction clutches, for example, lamellar clutches. A correspondingly greater need for installation space and components and a substantially more complex activation via a hydraulic circuit having variable control pressure, for example, would also be necessary here.

The drive device shown in FIG. 1 allows various driving states, which are identified in a switching matrix of FIG. 2 by I to XII. Various gear stages or driving states are described in the second column having the title "description".

In the second column, which is headed by "type", the type of the drive may be recognized. The designation DE stands for a diesel-electrical or internal combustion engine-electrical operation, i.e., the use of the drive device 1 as a serial hybrid drive. Correspondingly, a G is entered in the column identified by 3 for the first electrical machine 3, which symbolizes the generator operation of this electrical machine 3. In the next column identified by 4, which symbolizes the state of the second electrical machine 4, an M is entered, which stands for motor operation. In the next column of the switching matrix, which is provided with the reference numeral 2, the state of the internal combustion engine 2 is shown, analogously to the electrical machines 3, 4, M standing for a motor operation of the internal combustion engine 2 and a – standing for the machine not being operated. In the case of the two driving states of braking, which are identified by XI and XII, MB is additionally optional and is therefore entered in parentheses in the column identified by 2. This stands for the engine braking operation or drag operation, in which additional braking torque is generated by dragging along the internal combustion engine 2, if this is desired or necessary.

The two following columns of the switching matrix are provided with the reference numerals 26 and 27 and describe the switching state of the switching device 24 or its dog clutches 26 and 27. In this case, + stands for the closed state, while – stands for the open state of the respective dog clutch. The two last columns having the reference numerals 31 and 32 describe, analogously thereto, the switching state of the dog clutches 31 and 32 of the switching module 29 in the transmission 5. The + also stands for the closed state of a clutch again here, while the – stands for the open state of the respective dog clutch.

The transmission 5 thus has the driving state identified by I, as results from the "description", in the gear stage 1. The dog clutch 31 is therefore open and the dog clutch 32 is closed. The sun wheel 18 is thus fixed in relation to the housing 20. The driving state is additionally characterized as diesel-electric DE, so that the first electrical machine 3 runs in generator operation and the second electrical machine 4 runs in motor operation. In order to drive the first electrical machine 3 in generator operation and additionally to provide the electrical power required for driving the output 19, the internal combustion engine 2 drives the first electrical machine 3 as a generator in motor operation. In order to implement this, the dog clutch 26 is open and the dog clutch 27 connects the second electrical machine 4, which is operated as a motor, to the output shaft 15. The internal combustion engine 2 and the first electrical machine 3 are therefore not connected mechanically, but rather only electrically to the output 19.

The driving state identified by II is identified in the column "type" with E, which stands for solely electrical operation, and requires the power storage unit 25 or functions using energy provided therefrom. The state differs from the driving state I solely in that the first electrical machine 3 is not operated, nor is the internal combustion engine 2.

The driving state identified by III describes the third possibility, namely the direct operation D via the internal combustion engine 2. Correspondingly, the first electrical machine runs along without power, as symbolized by 0, or can optionally be operated as a motor using electrical power from the power storage unit 25, in order to provide additional drive power, for example, during acceleration. The electrical machine 4 is decoupled, as may be seen by the switching state of the clutches 26 and 27. Therefore, they are not also driven along. Power losses in the area of the second electrical machine 4 are thus avoided. The output 19 is therefore driven as a motor vehicle internal combustion engine 2. The driving states IV, V, and VI describe the analogous driving states to I, II, III, but in the gear stage 2 of the transmission 5. This is obvious from the altered switching position of the clutches 31, 32.

The driving state identified by VII identifies the state of a vehicle equipped with the drive device 1 when the internal combustion engine 2 is running or is not running. The internal combustion engine 2 can also either run or be turned off when stationary. The mechanical connection is disconnected via the dog clutches 26, 27. The dog clutches 31, 32 can remain in any desired position. This is shown accordingly in the switching matrix. The driving state identified by VIII describes the starting of the internal combustion engine 2. It will typically presume electrical travel or a standstill, in each case with stationary internal combustion engine 2, as the initial state. A state is set via the dog clutches 26 and 27, which couples the second electrical machine 4 to the output shaft 15. The dog clutch 26 is opened for this purpose, and the dog clutch 27 is closed. It is not decisive in this driving state which constellation the dog clutches of the transmission 5 are in, since only the direct connection or the connection via the torsional vibration damper 6 between the internal combustion engine 2 and the first electrical machine 3 is significant for the starting. These two assemblies, which are connected to one another, are decoupled from the output 19. The first electrical machine 3 can be operated in motor operation and thus rotates the internal combustion engine 2, so that it can be started and then also changes into the motor operation shown in the switching matrix, while the first electrical machine 3 is simultaneously turned off or changes into generator operation.

The driving states identified by IX and X describe the reverse gear or the reverse travel. The reverse gear is always implemented via the second electrical machine 4 in motor operation in this construction, either using electrical power from the electrical power storage unit 25 in the electrical driving state identified by X or using electrical power which is generated via the internal combustion engine 2 and the first electrical machine 3 in generator operation, in the diesel-electrical driving state XI. The required torque having the required rotational direction is provided at the output 19 via the second electrical machine 4 via the power electronics or the inverters 22, 23. The two dog clutches 31, 32 in the transmission 5 typically remain in the switching state of the gear stage 1, since the reverse travel is generally rather slow. Fundamentally, however, reverse travel having a switching constellation of the dog clutches 31 and 32 in the gear stage 2 of the transmission 5 would also be possible.

The two driving states which are characteristic for braking will now be described by XI and XII. During the braking from the diesel-electrical operation, which is identified by XI, i.e., the switching position of the dog clutches 26, 27 analogous to a serial hybrid, independently of the switching position in the transmission 5, the braking can be performed via the second electrical machine 4 in generator operation G. The electrical power thus arising is stored in the power storage unit 25. In the cases in which the electrical power storage unit 25 is full and cannot absorb the power arising during braking via the second electrical machine 4 in generator operation G, the first electrical machine 3 can also be operated as a motor, as optionally shown by the operation M in parentheses. It drags the internal combustion engine 2, so that additional engine braking torque is available and braking power is additionally available by the dragging of the internal combustion engine 2. Alternatively or additionally, the electrical power generated by the second electrical machine 4 in generator operation G can also be absorbed via heating resistors or other electrical consumers. In the state of the braking identified by XII, the operation is solely performed via the internal combustion engine 2, this fundamentally also being possible in the gear stages 1 and 2, i.e., independently of the switching of the transmission 5. In this case, because of the closed dog clutch 26 and the open dog clutch 27, the second electrical machine 4 is again decoupled. Regenerative braking is performed in this case via the first electrical machine 3, which is accordingly operated as a generator. If the braking torque thus to be applied is inadequate, the internal combustion engine 2 can additionally be dragged, as indicated in the column for the internal combustion engine 2, so that an engine braking torque is additionally applied.

Figure 3:
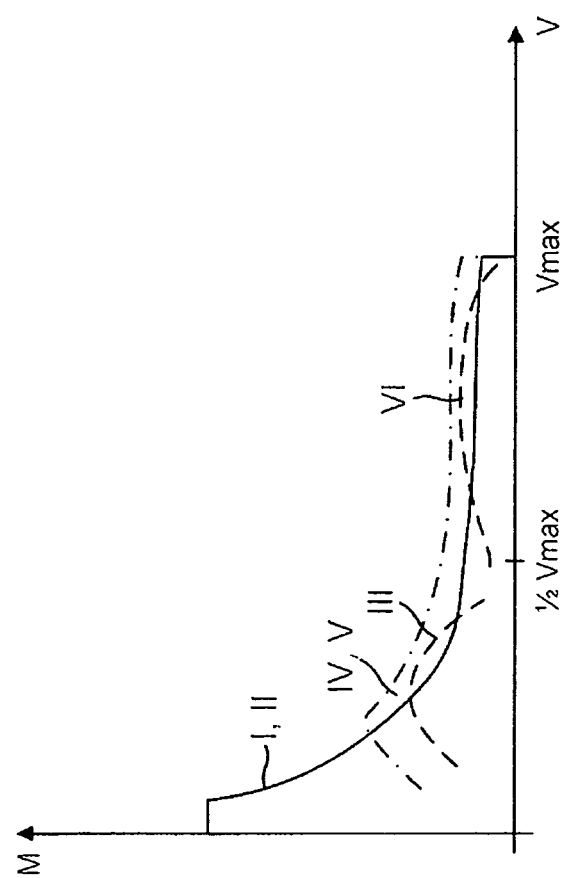
FIG. 3 shows a graph of the output drive torque over the travel velocity in various driving states of a vehicle driven using the drive device according to FIG. 1.

The typical operation will be described hereafter with reference to the graph shown in FIG. 3 of the torque M over the velocity V of a vehicle equipped with the drive device 1. Fundamentally, either solely electrical or diesel-electrical travel can be used from starting until reaching the highest velocity $V_{max}$, i.e., the driving states I, II, IV, V. This is shown by the solid line identified by I, II. The range having the identification IV, V is made possible by the changeover of the gear stage in the transmission 5 from 1 to 2. It may be seen that through the changeover in the transmission 5 at the respective velocity, a correspondingly higher torque can be provided. In addition, two ranges of the direct operation having internal combustion engine 2 coupled to the output shaft 15 may be seen. These are each shown by dashed lines and are identified by III and IV, corresponding to the driving states from FIG. 2.

In the driving states identified by I, II and IV, V, the electrical power is generated by the internal combustion engine 2 in the first electrical machine 3 as a generator or originates from the electrical power storage unit 25. It is conducted via the corresponding inverters 22 or 23 to the second electrical machine 4, which ensures the drive as a motor. The changeover of the transmission 5 from the gear stage 1 to the gear stage 2 are switchable within an overlap range of the two characteristic diagrams by short-term relief of the dog clutches 31, 32 and a counter torque of the second electrical machine 4 and by a speed equalization. The above-described alternative use of a synchronizing clutch or a lamellar clutch is also possible, but increases the outlay for components with a simpler strategy.

In particular in the switching state identified by VI, a better efficiency is achieved at correspondingly higher velocity through the direct drive of the output 19 by the internal combustion engine 2 than in the case of electrical transmission of the drive power. Therefore, at correspondingly high velocities, this state analogous to a parallel hybrid can be induced by switching using the switching device 24, so that then travel occurs in the driving state identified by VI. Since a mechanical connection must be implemented between the internal combustion engine 2 and the output shaft 15 for only two of the driving states here, this can be implemented very simply, compactly, and cost-effectively using the described construction of the drive device 1. In contrast to a solely parallel hybrid, which must implement various driving states via a direct connection of the internal combustion engine 2, a significant part of the mechanical outlay required for a parallel drive can thus be dispensed with.

The invention claimed is:
1. A drive device comprising:
an internal combustion engine; and a first electrical machine and a second electrical machine, the first electrical machine being at least indirectly connectable to the internal combustion engine and is connected to an output shaft;

wherein a single switching device is provided by which, in a first state, the internal combustion engine or the first electrical machine which is connected to the internal combustion engine is connected to the output shaft and the second electrical machine is decoupled from the output shaft; and wherein in a second state, the second electrical machine is connected to the output shaft and the internal combustion engine or the first electrical machine which is connected to the internal combustion engine is decoupled from the output shaft.

2. The drive device according to claim 1, characterized in that the first electrical machine is connected directly or via a torsional vibration damper to the internal combustion engine.

3. The drive device according to claim 1, characterized in that the output shaft is connected via a transmission, having at least two gear stages which are switchable via a switching module, to the output.

4. The drive device according to claim 1, characterized in that the switching device and/or a switching module are implemented as dog clutches.

5. The drive device according to claim 1, characterized in that the switching device and/or the switching module are implemented as dog clutches having synchronizing elements or friction clutches.

6. The drive device according to claim 1, characterized in that at least one of the electrical machines is implemented as a transversal flux machine.

7. The drive device according to claim 1, characterized in that both electrical machines are implemented as transversal flux machines, the first electrical machine being designed as a generator and the second electrical machine as a drive motor having field attenuation.

8. The drive device according to claim 1, characterized in that the two electrical machines are implemented as transversal flux machines, the first electrical machine being implemented as a monophasic electrical machine, which is implemented having identical construction to one half of the second electrical machine, which is implemented as a biphasic electrical machine.

9. A use of the device according to claim 1, for driving a road or railway vehicle, in particular a utility vehicle or bus.

10. The drive device according to claim 1, characterized in that the two electrical machines and the switching devices, and optionally the transmission and the switching module, are situated in a common housing.

11. The drive device according to claim 10, characterized in that a structure-borne noise insulation and/or an electrical insulation is situated between the housing and at least some of the components situated therein.

12. The drive device according to claim 1, characterized in that the shafts of the internal combustion engine and the two electrical machines are aligned with one another.

13. The drive device according to claim 12, characterized in that the first electrical machine is connected directly or via a torsional vibration damper to the internal combustion engine.

14. The drive device according to claim 12, characterized in that the output shaft is connected via a transmission, having at least two gear stages which are switchable via a switching module, to the output.

15. The drive device according to claim 12, characterized in that the second electrical machine is implemented having a hollow shaft, through which the output shaft is guided.

16. The drive device according to claim 15, characterized in that the first electrical machine is connected directly or via a torsional vibration damper to the internal combustion engine.

17. The drive device according to claim 15, characterized in that the output shaft is connected via a transmission, having at least two gear stages which are switchable via a switching module, to the output.

18. The drive device according to claim 15, characterized in that the switching device is situated between the two electrical machines.

19. The drive device according to claim 18, characterized in that the first electrical machine is connected directly or via a torsional vibration damper to the internal combustion engine.

20. The drive device according to claim 18, characterized in that the output shaft is connected via a transmission, having at least two gear stages which are switchable via a switching module, to the output.

* * * * *